(12) United States Patent
Erickson et al.

(10) Patent No.: US 7,606,127 B2
(45) Date of Patent: Oct. 20, 2009

(54) SYSTEM AND METHOD FOR EMBEDDING OPTICAL DRIVE COMPATIBILITY INFORMATION IN OPTICAL MEDIA

(75) Inventors: Dirk Erickson, Austin, TX (US); Robert A. Brondijk, Eindhoven (NL); Jaconus Petrus Josephus Heemskerk, Eindhoven (NL); Jakob G. Nijboer, Eindhoven (NL); Christiaan Steenbergen, Austin, TX (US); Charles R. Weirauch, Loveland, CO (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 12/121,097

(22) Filed: May 15, 2008

(65) Prior Publication Data

US 2008/0212420 A1    Sep. 4, 2008

Related U.S. Application Data

(63) Continuation of application No. 10/886,179, filed on Jul. 7, 2004, now Pat. No. 7,391,694.

(51) Int. Cl.
*G11B 15/52* (2006.01)
(52) U.S. Cl. .................................. 369/47.55; 369/53.37
(58) Field of Classification Search ........................ None
See application file for complete search history.

(56) References Cited

U.S. PATENT DOCUMENTS 6,154,437 A    11/2000    Utsunomiya et al.

| | | | |
|---|---|---|---|
| 6,407,976 B2 | 6/2002 | Nagara et al. | |
| 6,445,669 B1 | 9/2002 | Hattori et al. | |
| 6,469,968 B1 | 10/2002 | Van Den Enden et al. | |
| 6,912,187 B2 | 6/2005 | Steenbergen | |
| 7,391,694 B2 | 6/2008 | Erickson et al. | |
| 7,423,943 B2 | 9/2008 | Halloush et al. | |
| 7,483,342 B2 | 1/2009 | Hendrickson et al. | |
| 2001/0048659 A1* | 12/2001 | Weirauch et al. | 369/275.3 |
| 2002/0048241 A1 | 4/2002 | Kumagai et al. | |
| 2002/0114233 A1* | 8/2002 | Sasaki et al. | 369/47.51 |
| 2003/0133376 A1* | 7/2003 | Matsumoto | 369/47.12 |

(Continued)

FOREIGN PATENT DOCUMENTS

EP    1049089 A2    4/2000

(Continued)

*Primary Examiner*—Paul Huber
(74) *Attorney, Agent, or Firm*—Hamilton & Terrile, LLP; Robert W. Holland

(57) ABSTRACT

Compatibility information embedded in an optical medium modifies actions allowed by predetermined non-compatible optical disc drives on the optical medium, such as optical disc drives that may suffer damage if certain actions are performed on the optical medium. For instance, a compatibility engine of the optical disc drive applies compatibility information read from an optical medium to determine restrictions to impose on the use of the optical medium, such as restricting the optical disc drive from writing to the optical medium, reading from the optical medium or performing any operations until an update to the optical disc drive firmware is performed either automatically or by display of a compatibility user interface at an information handling system associated with the optical disc drive. In one embodiment, the compatibility information identifies incompatible optical disc drives and firmware versions by unique identifiers.

11 Claims, 2 Drawing Sheets

U.S. PATENT DOCUMENTS

| | | |
|---|---|---|
| 2003/0179675 A1* | 9/2003 | Kim et al. ............... 369/53.21 |
| 2003/0223325 A1 | 12/2003 | Shimano et al. |
| 2003/0223339 A1 | 12/2003 | Taniguchi et al. |
| 2004/0062166 A1 | 4/2004 | Tanimukai et al. |
| 2004/0088632 A1 | 5/2004 | Hwang et al. |
| 2004/0202057 A1* | 10/2004 | Ko ....................... 369/30.04 |
| 2005/0013226 A1* | 1/2005 | Suzuki ................... 369/53.24 |

FOREIGN PATENT DOCUMENTS

| | | |
|---|---|---|
| EP | 1293981 | 3/2003 |
| EP | 1329879 | 7/2003 |
| EP | 1403865 A1 | 9/2003 |
| JP | 2002074855 | 3/2002 |
| JP | 2003067923 | 7/2003 |
| JP | 2004005772 | 1/2004 |
| JP | 2004030742 A | 1/2004 |
| JP | 2004127386 | 4/2004 |
| WO | 2004/072966 A1 | 8/2004 |

* cited by examiner

SYSTEM AND METHOD FOR EMBEDDING OPTICAL DRIVE COMPATIBILITY INFORMATION IN OPTICAL MEDIA

This application is a continuation of application Ser. No. 10/886,179, filed Jul. 7, 2004 now U.S. Pat. No. 7,391,694, entitled "System and Method for Embedding Optical Drive Compatibility Information in Optical Media" and naming Dirk Erickson, Robert A. Brondijk, Jacobus Petrus Josephus Heemskerk, Jakob G. Nijboer, Christiaan Steenbergen, and Charles R. Weirauch s as inventors, which is hereby incorporated by reference in its entirety.

BACKGROUND OF THE INVENTION

1. Field of the Invention

The present invention relates in general to the field of storing information on optical media, and more particularly to a system and method for embedding optical drive compatibility information in optical media.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often generate relatively large quantities of information for storage, particularly in the use of multimedia applications, such as applications that generate or store picture, video or audio information. Although hard disc drive storage capacity has increased over the past several years to satisfy the permanent storage needs of many information handling system users, portable magnetic disc storage capacity has remained largely stagnant. As a result, information handling system users are increasingly turning to optical storage media as a more practical solution for storing information in a portable manner. Optical storage media generally stores information by modification of optical material with a laser and reads information by illuminating the optical material with the laser and measuring the laser light reflected from the optical material. Optical storage media come in a variety of forms including compact discs (CD) that use infrared lasers for storing and reading information, digital versatile discs (DVD) that use red lasers and Blu-Ray discs (BD) that use blue lasers for storing and reading information. As the wavelength of the laser decreases in size, the optical media is generally capable of storing greater quantities of information.

One difficulty with the use of optical media is that a wide variety of materials and designs are often used to manufacture optical media so that optical disc drives will often write information with varying quality to different optical media, depending upon the types of material and design used in the optical media. In order to compensate for the various materials and designs of optical media, optical disc manufacturers typically test each type of optical media as it becomes available in order to develop write strategies to use in writing information to each optical media. The write strategies vary the parameters used to write information with the laser, such as the power setting for the laser, in order to obtain desired accuracy for writing information. The write strategies are typically stored in optical disc drive firmware by association with a unique identification code for each type of optical media. The unique identification code is embedded in the optical media using a standardized format so that the optical disc drive is able to read the identification code from an inserted optical medium and set the write parameters for the write strategy associated with the identification code that is stored in the firmware. Although the use of embedded information allows an optical drive to dynamically adjust write strategies based on media characteristics, after an optical drive is deployed to an end user the optical drive will not recognize newly issued identification codes for optical media released after manufacture of the drive. Although some optical drive manufacturers offer updated identification tables and write strategies, such as for download through the Internet, users rarely if ever update optical drive firmware and often are unaware of the availability or desirability of such firmware updates. In some instances, attempting to write information from an optical disc drive to an optical medium without proper identification and proper use of a current write strategy results in physical and even catastrophic damage to the optical drive, such as optical pickup unit damage or laser burn-out. Alternatively, information written to an unrecognized optical medium is sometimes not retrievable. Similarly, in rare cases optical drives have been shown to be incompatible with certain media designs relative to their read or servo operations. When such circumstances arise, the optical disc drive or optical media manufacturer generally attempts to warn users of the risk or undertakes an expensive recall of the optical media.

SUMMARY OF THE INVENTION

Therefore a need has arisen for a system and method which updates optical drive recognition of optical media for determining compatibility of the optical media and the optical drive.

In accordance with the present invention, a system and method are provided which substantially reduce the disadvantages and problems associated with previous methods and systems for determining compatibility of optical media with optical disc drives. Compatibility information embedded in an optical medium prevents optical disc drives that are incompatible with the optical medium from performing incompatible actions that risk physical damage to the optical disc drive. Operations allowed by the optical disc drive are modified with incompatible optical media to restrict undesirable results.

More specifically, a compatibility table embedded on an optical medium identifies optical disc drives by firmware version that are not physically compatible with the optical medium in that a risk of physical damage exists if optical disc drive operations are performed with the optical medium. The embedded compatibility information is read upon initial insertion of the optical medium in the optical disc drive and analyzed by a compatibility engine associated with the optical disc drive to determine appropriate modifications to the actions permitted by the optical disc drive with the optical medium. For instance, incompatibility may result in a consistent action, such as disabling of write capability, or may depend upon defined modifications in the compatibility table. One example of a modification to the operation of the optical disc drive is display of an interface to a user of an associated information handling system that directs the user to update the firmware of the optical disc drive before using the inserted optical medium. Firmware updates are alternatively automatically supported with an optical drive firmware update engine running on the information handling system.

The present invention provides a number of important technical advantages. One example of an important technical advantage is that identification and compatibility information are embedded on an optical medium so that optical disc drives that are incompatible with the optical medium will avoid damage. For instance, a list of optical disc drives and firmware versions embedded in the optical medium indicates that an attempt to write by the optical disc drive to the optical medium could result in catastrophic damage. Upon determining an incompatibility with an inserted optical medium, the optical disc drive displays a warning to the user of the risk and instructions for obtaining a firmware update to protect against damage. Thus, the information handling system user avoids damage to the system and obtains instructions to help make the optical media usable for the drive. Alternatively, detection of an incompatibility results in automatic download to the optical disc drive of a firmware update to correct the incompatibility, such as an Internet download or a download from the optical medium itself.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Optical disc drives are protected from damage introduced by incompatible optical media by reading and applying compatibility information embedded in the optical media. Compatibility information is applied in cooperation with an associated information handling system to modify actions allowed by the optical disc drive. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
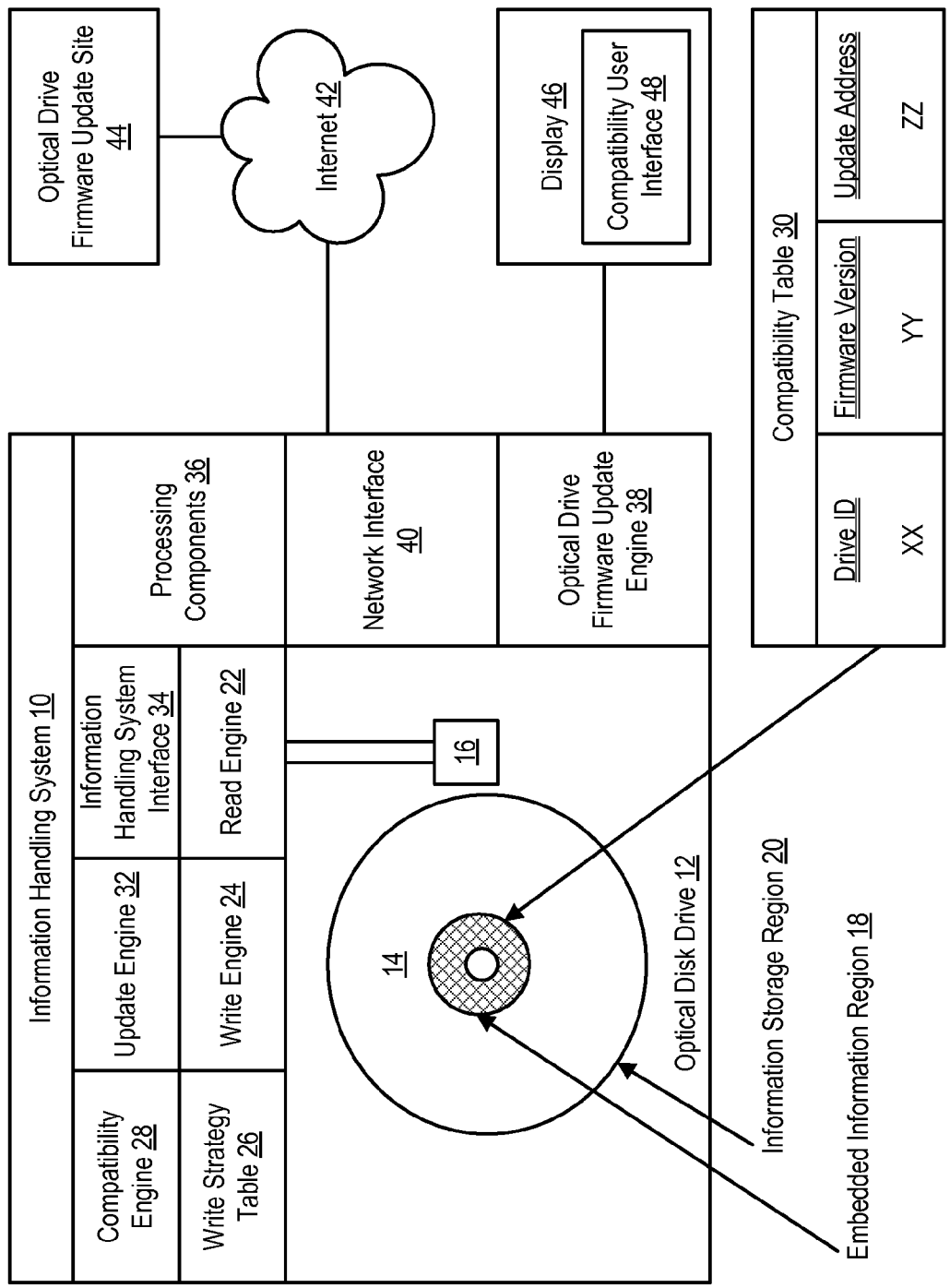
FIG. 1 depicts a block diagram of an information handling system having an optical disc drive configured to apply compatibility information embedded on an optical medium.

Referring now to FIG. 1, a block diagram depicts an information handling system 10 having an optical disc drive 12 configured to apply compatibility information embedded on an optical medium 14, such as a BD disc. Optical disc drive 12 has an optical pickup unit 16 that includes a laser, which illuminates optical medium 14, and an optical pickup, which receives and measures light reflected from optical medium 14 by the laser. Upon initial insertion of an optical medium, optical pickup unit 18 reads embedded information from an embedded region of optical medium 14 to configure itself for interacting with an information storage region 20 of optical medium 14 in an appropriate format. A read engine reads embedded optical medium identification information to determine the type of optical medium, such as the DVD or CD format used for the optical medium, and configures optical pickup unit to use an appropriate laser and laser settings for illuminating the optical medium to read information. A write engine 24 applies the optical medium identification information to select an appropriate write strategy from a write strategy table 26 for writing information to the optical medium. If the optical medium identification information is unrecognized by read engine 22 or write engine 26, then default read and write strategies are applied for reading and writing information from optical medium 14, possibly using non-drive-specific write strategy information available on the media.

In order to reduce the risk of physical damage to optical disc drive 12, and in particular to optical pickup unit 16, a compatibility engine 28 reads the embedded information from embedded information region 18 to retrieve a compatibility table 30. Compatibility table 30 includes optical disc drive identification codes that identify optical disc drives having a physical incompatibility with optical medium 14 that introduces a risk of physical damage to the optical disc drive or medium. In addition, for each optical disc drive, compatibility table 30 identifies the firmware version or versions of the optical disc drive that have the incompatibility and an update address having a firmware version update to correct the incompatibility. The identifiers are maintained static between release of an optical disc drive and modifications to the optical disc drive's firmware to minimize the number of table entries per optical media so that compatibility table 30 has a reduced size within the embedded region. In addition, compatibility table 30 may include codes for specific compatibility actions that modify the operations available on optical disc drive 12 for the optical medium 14. Compatibility table 30 has a header area, drive compatibility information area and termination area within the embedded region, but may also point to other portions of the optical medium that hold more detailed information where appropriate.

Compatibility engine 28 compares the identification code and firmware version of optical disc drive 12 with those in compatibility table 30 and, if a match is found, determines an appropriated modification or restriction for optical disc drive 12 to use in reading or writing to optical medium 14. For instance, compatibility engine 28 restricts write engine 24 from writing to optical medium 14, restricts read engine 22 from reading information from optical medium 14 or restricts any further actions until a firmware update is performed by update engine 32 which addresses the incompatibility. The firmware update may be obtained, for instance, through an information handling system interface 34 which communicates the update address to information handling system 10 to contact an update site or may be included on optical medium 14, either in the embedded region 18 or the information storage region 20.

A user of information handling system 10 interacts with optical disc drive 12 through information handling system interface 34. Processing components 36, such as the CPU, memory, operating system and applications, handle information generated to write to optical medium 14 and information read from optical medium 14. In the event that compatibility engine 28 determines that an optical medium is incompatible with optical disc drive 12, update engine 32 communicates the incompatibility to an optical drive firmware update engine 38, such as a module within the operating system driver for optical disc drive 12. Optical drive firmware update engine 38 communicates through a network interface 40 and Internet 42 to contact an optical drive firmware update site 44 to obtain an up-to-date firmware version for optical disc drive 12. Optical drive firmware update engine 38 interfaces with a display 46 to present a compatibility user interface 48 for a user to manage the use of optical medium 14 on optical disc drive 12. For instance, the display may inform the user that the optical medium is incompatible and should be removed, or may explain to the user that use of the optical medium is restricted unless the user obtains a firmware update that will make the optical medium useable. In order to reduce the size of compatibility table 30, optical disc drives are generally identified as incompatible when their use of the optical medium result in catastrophic failure. However, compatibility table 30 may alternatively base compatibility on content of an optical medium and the playability of the content on various optical disc drives. In this manner, a content provider may gracefully inform a user that the content of the optical medium is not compatible with the user's optical disc drive.

Figure 2:
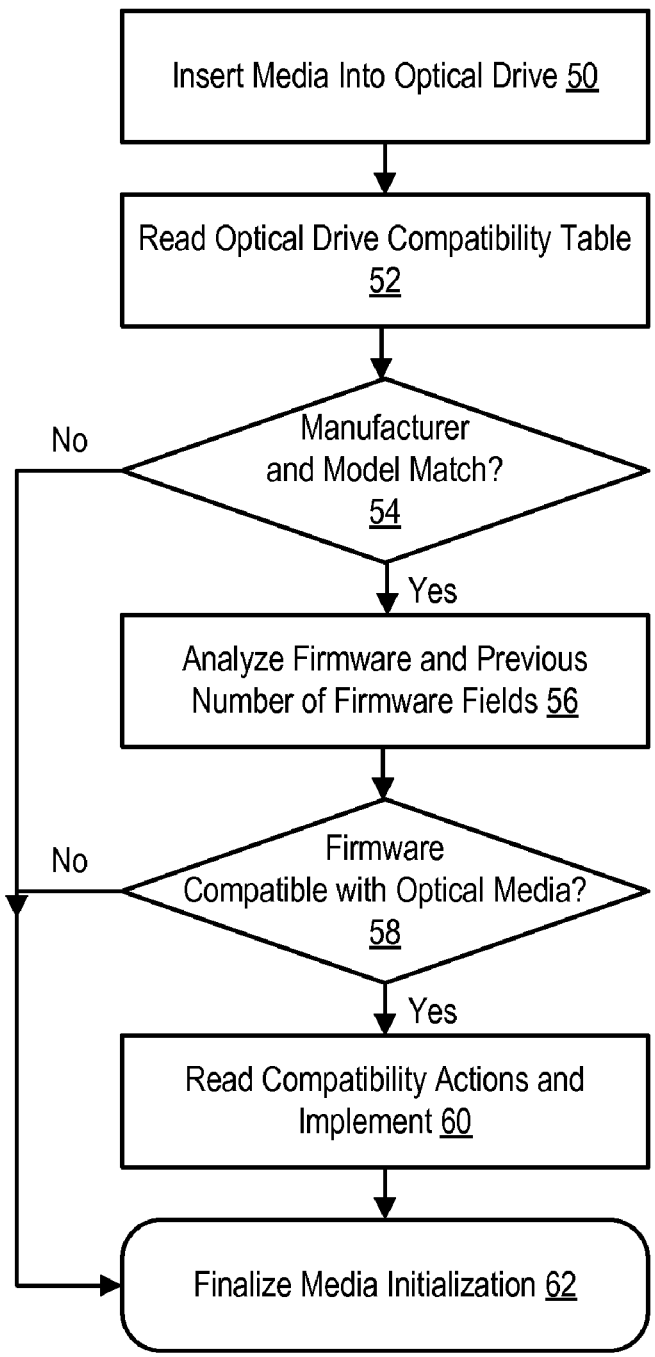
FIG. 2 depicts a flow diagram of a process to apply embedded compatibility information to modify actions allowed by an optical disc drive on an inserted optical medium.

Referring now to FIG. 2, a flow diagram depicts a process to apply embedded compatibility information to modify actions allowed by an optical disc drive on an inserted optical medium. The process begins at step 50 with insertion of an optical medium in an optical disc drive and continues to step 52 at which the optical disc drive compatibility information is read by the optical disc drive. At step 54 a determination is made of whether a match exists between the optical disc drive's identification code and the identification codes found in the compatibility table. If no match is found at step 54, the process continues to step 62 for final initialization of the optical medium. If a match is found, the process continues to step 56 for analysis of the firmware version of the optical medium compared with the previous number of firmware fields in the compatibility table. For instance, if three firmware updates exist for the optical disc drive in the compatibility table before the incompatibility was corrected, and the current firmware of the optical disc drive is the fifth update, then at step 58 a determination is made that the firmware is compatible with the optical medium and the process continues to step 62. If, in contrast, the current firmware update is the second update, then at step 58 a determination is made that the firmware is not compatible with the optical medium. At step 60, compatibility actions are read from the optical medium and implemented at the optical disc drive, such as prohibiting writes to the optical medium or requiring an update to the firmware of the optical disc drive before permitting use of the optical medium. Downloading of updated drive firmware may correct a variety of write settings, such as by providing new write strategy content or other new properties to avoid catastrophic impact between drive and media, like different read power settings, new servo parameters or new calibration routines. Once the modified actions are enforced, the process continues to step 62 at which the optical medium's initialization is finalized with the appropriate restrictions.

Although the present invention has been described in detail, it should be understood that various changes, substitutions and alterations can be made hereto without departing from the spirit and scope of the invention as defined by the appended claims.

What is claimed is:

1. An optical drive comprising:
   an optical pickup unit operable to read information from the optical medium; and
   a compatibility engine interfaced with the optical pickup unit and operable to manage a read by the optical pickup unit of compatibility information from the optical medium, the compatibility information comprising a list of optical drive manufacturer identifier having optical disc drives that are incompatible with the optical medium, the compatibility engine further operable to apply the compatibility information to modify one or more actions permitted by the optical disc drive with the optical medium.

2. The optical drive of claim 1 wherein the one or more modified actions comprise preventing a write to the optical medium by the optical disc drive.

3. The optical drive of claim 1 wherein the one or more modified actions comprise preventing a read of further information from the optical medium by the optical disc drive.

4. The optical drive of claim 1 wherein the modified action is preventing any further use of the optical medium by the optical disc drive.

5. The optical drive of claim 1 wherein the modified actions comprise altering firmware of the optical disc drive for writing information to the optical medium.

6. The optical drive of claim 1 wherein the modified actions comprise display at an information handling system of a user interface identifying the optical medium as not compatible with the optical disc drive before any further actions are allowed with the optical drive.

7. The optical drive of claim 1 wherein the optical medium comprises a Blu-Ray disc.

8. A method for managing compatibility of optical media and optical drives, the method comprising:
   determining that an optical medium and an optical drive have an incompatibility associated with risk of physical damage to the optical drive;
   embedding storing compatibility information in the on an optical medium, the compatibility information comprising a list of optical drive identifiers to identify optical drives that are incompatible with the optical medium identifying the optical drive;
   inserting the optical medium into the an optical drive;
   reading the compatibility information with the optical drive;
   applying the compatibility information to modify one or more actions permitted by the optical drive.

9. The method of claim 8 wherein applying the compatibility information further comprises prohibiting writes from the optical drive to the optical medium.

10. An optical disc drive comprising:
   an optical pickup unit operable to read information from an optical medium; and
   a compatibility engine interfaced with the optical pickup unit and operable to manage a read by the optical pickup unit of compatibility information from the optical medium, the compatibility information comprising a list of optical drive identifiers to identify optical drives that are incompatible with the optical medium, the compatibility engine further operable to apply the compatibility information to modify one or more actions permitted by the optical disc drive with the optical medium.

11. The optical disc drive of claim 10 wherein the one or more actions comprises a write to the optical medium.

* * * * *